July 11, 1939.  J. B. SWAN  2,165,662
JOURNAL BOX GUIDE MEANS
Filed Aug. 3, 1937  2 Sheets-Sheet 2
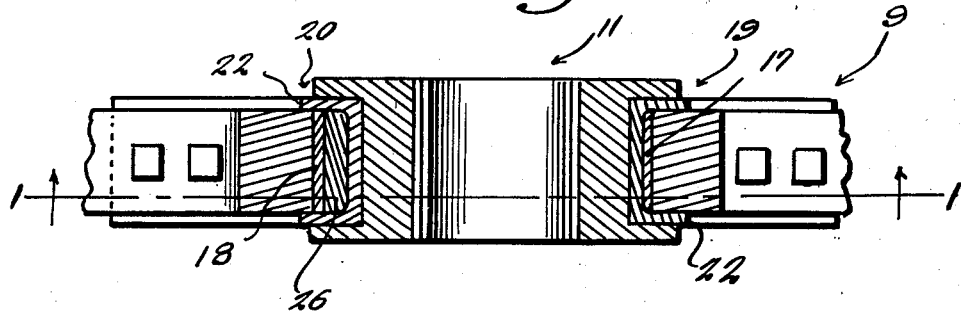
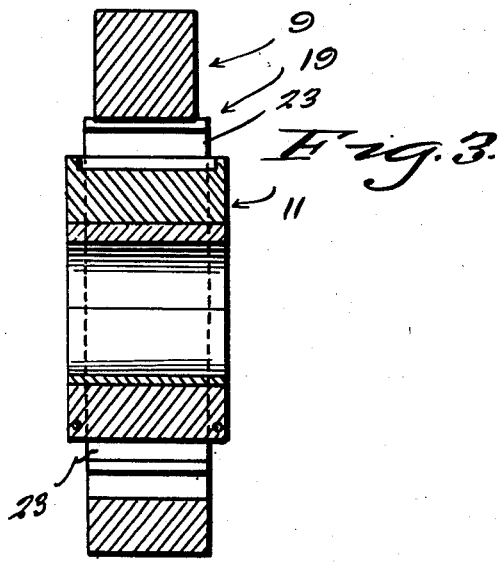
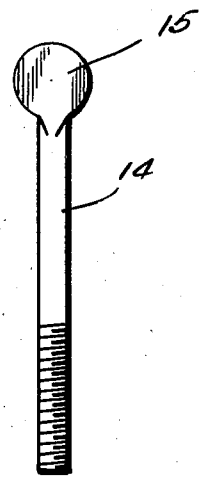
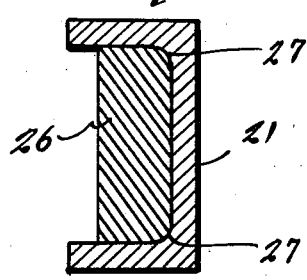
Inventor
John B. Swan
By Clarence A. O'Brien
Hyman Berman
Attorneys Patented July 11, 1939

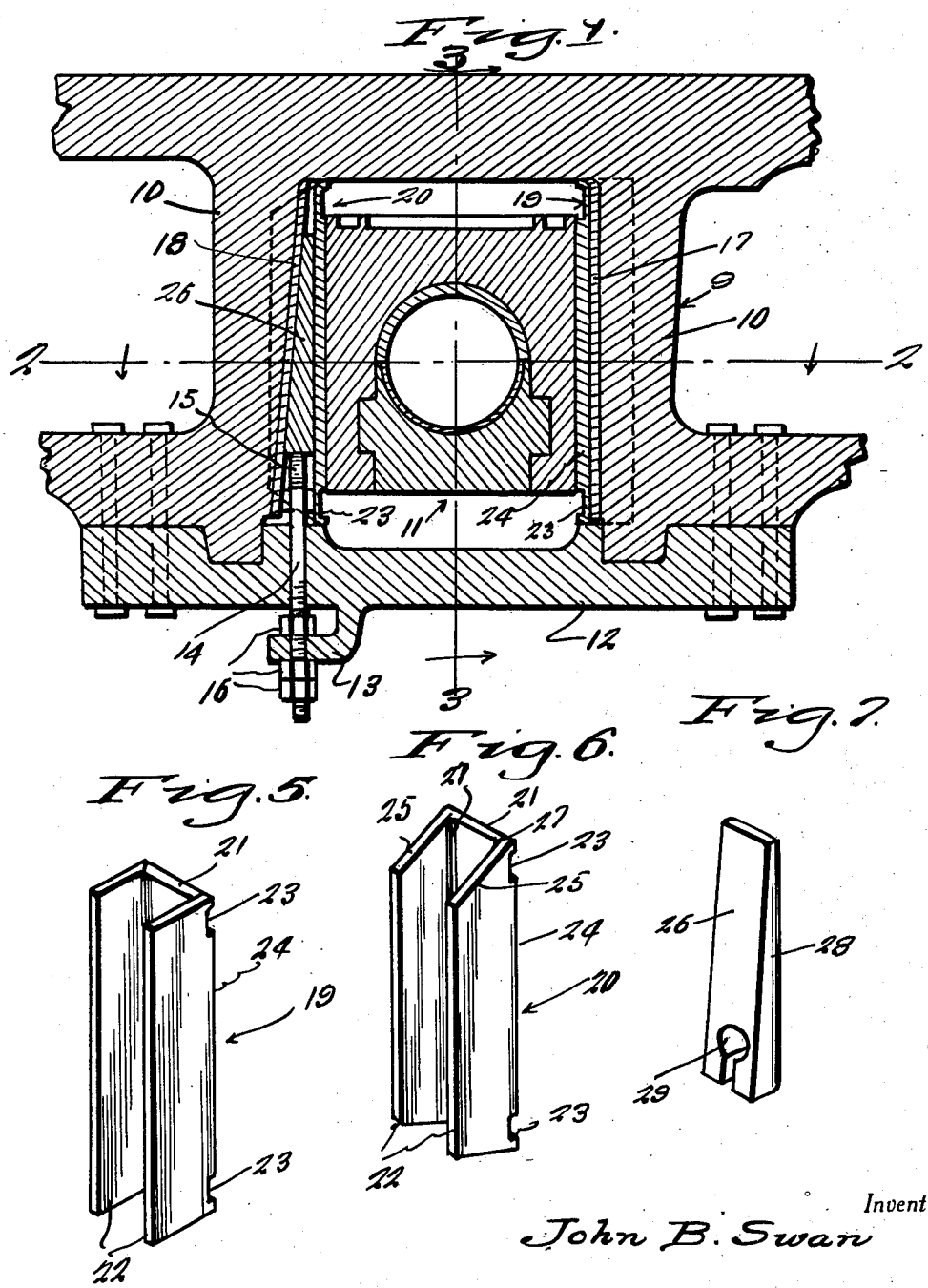

2,165,662

UNITED STATES PATENT OFFICE 2,165,662

JOURNAL BOX GUIDE MEANS

John B. Swan, Gladstone, Mich.

Application August 3, 1937, Serial No. 157,183

2 Claims. (Cl. 308—66)

The present invention relates to novel and improved guide means for a reciprocatory journal box of the type used on present day locomotives, and the purpose of the invention is to provide adjustable guides of an appreciably refined style susceptible of more satisfactorily accommodating the perpendicularly shiftable journal box.

It is believed that the purpose and structural distinctions of the invention may better be understood by comparison with Patent 1,239,538, covering an adjustable wedge granted to me under date of September 11, 1917. Reference being had to said patent, it will be observed that it comprises briefly, complemental, channel-shaped guides removably mounted in place and disposed on opposite vertical edges of the journal box, said guides constituting adapter and wear plates for the slidable journal box. One guide constitutes a channel-shaped sheath to accommodate an adjusting wedge having associated therewith bolt and nut means for precision adjustment in a manner to compensate for proper maintenance of the guide surfaces as they are gradually worn away.

By comparison, the subject matter of the instant application is possessed of several distinguishable improvements. First, and of outstanding importance, the opposed companion vertically disposed channel-shaped guides in contact with meeting surfaces of the journal box are grooved or cut away at opposite ends to provide an intervening wear surface of a self-truing type, whereby to insure a constantly level matching association with the journal box.

Secondly, that guide constituting a sheath or adapter for the wedge is of a cross-sectional shape so that the so-called corners of the channel become rounded to accommodate correspondingly shaped corner portions on the wedge, whereby to prolong the life of the wedge by rendering it more stable and less susceptible to breakage at its fragile tapered end.

Then, too, novelty is predicated, as will be hereinafter seen, in a simplified keyhole notch which serves to accommodate a disk-like head on the adjusting bolt.

Other features and advantages may become apparent from the succeeding description and drawings.

In the drawings, wherein like numerals are employed to designate like parts throughout the views:

Figure 1 is a view primarily in section, with the adjusting bolt in elevation, showing the conventional car frame, journal box, and the improved adjustable guide means associated with the journal box frame, the section being on the line 1—1 of Figure 2.

Figure 2 is a horizontal section on the plane of the line 2—2 of Figure 1.

Figure 3 is a vertical section at right angles to Figure 2, the section being on the line 3—3 of Figure 1.

Figure 4 is an enlarged cross-section through the sheath and especially shaped adjusting wedge.

Figures 5, 6, and 7 are perspective views of details.

Figure 8 is a detail view of the wedge adjusting bolt.

In the drawings, in Figure 1, the locomotive frame structure is denoted by the numeral 9 and may be said to be substantially conventional. That is to say, it includes the usual spaced parallel members 10 defining a guide opening for the reciprocatory journal box 11. In this instance, however, the removable plate or head 12 is provided with a right angularly shaped bracket 13 to accommodate the shank of the bolt 14. Incidentally, this bolt is provided with a disk-like thrust and connecting head 15. The numerals 16 merely designate an assembly of nuts to maintain the bolt against displacement.

Before introducing the features of the invention in particular, it is to be observed that the numerals 17 and 18 designate steel thrust plates welded to the opposed inner surfaces of the aforementioned pedestal or post members 10. These are in effect permanent wear shims.

The channel-shaped guides interposed between the wear plates 17 and 18 and the journal box 11 are differentiated by numerals 19 and 20, respectively. The flanges of these respective parts are parallel to embrace the posts 10, while the web 21 between the flanges 22 is fashioned at opposite ends with transverse grooves 23 forming what may be called a riser 24 for direct contact with the adjacent surfaces of the slidable journal box or bearing unit 11. By providing these raised wear surfaces 24, it has been found that the wear is constant and even so that said surfaces become substantially self-leveling. The upper ends of the flanges 22 of the guide channel 20 are beveled, as indicated at 25.

In practice the guide unit 19 may be said to be relatively stationary and the complemental unit relatively movable inasmuch as it is adjusted toward and from the first-named unit to compensate for whatever wear takes place between the coacting surfaces of the parts 19, 20 and 11.

Particular attention is devoted to the guide channel unit 20 in that this is of such cross-sectional shape as to accommodate the especially shaped adjusting wedge 26. That is to say, at the juncture of the web 21 and the side flanges 22, the metal is molded or otherwise formed to provide rounded corners 27 of a curvature to correspond and accommodate the companion rounded convex corners or longitudinal edges 28 of said wedge. The lower end of the wedge is formed with a keyhole-shaped notch or keeper hole 29 to accommodate the shank and head 15 of the aforesaid adjusting bolt 14.

It is to be observed that the guide channel units 19 and 20 are of a length so that their opposite ends rest in direct contact with the adjacent portions of the associated frame 9 and means 10 and 12. This avoids displacement or shifting of said parts 19 and 20. In present day arrangements the reciprocatory motion and wear of the driving box causes the existing type wedge to become loose and the bolts break and occasionally the wedges stick, and either put the locomotive out of service temporarily or cause it to reduce speed to some 10 or 15 miles per hour. In the present arrangement the sheaths 19 and 20 embrace the parts 10 and coact with the steel welded wear plate 17 to provide a sturdy and dependable arrangement.

The features 27 and 28 provide an ingenious wedge and sheath assembly wherein the wedge is materially strengthened to promote easy adjustment and long wear.

By thickening the so-called risers or outstanding wear surfaces 24 on the parts 19 and 20 uniform wear is insured. It has been observed that the reciprocatory motion of the ordinary driving box is such that the middle of the sheath becomes worn quicker than the end portions. This uneven wear tends to belly the effective guiding surfaces and produces sticking such as interferes with the desired floating motion of the journal box.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. In combination with the opposed vertical pillars of a journal box frame, guides for the sides of the journal box, means for connecting the guides with the pillars to retain the same within the frame, said guides each having formed in their upper and lower faces diametrically opposed transverse grooves and resultant risers for slidably guiding the sides of the journal box, and said grooves providing clearance for the upper and lower side areas of the journal box to prevent formation of shoulders on the respective ends of the risers during vertical travel of the journal box in its frame.

2. A journal box guide means comprising opposed vertically arranged channel shaped guides receiving therein vertical pillars of a journal box frame, each of said guides including parallel flanges and a connecting web portion having transversely arranged grooves located adjacent the ends of said guide to provide on the web portion a riser extending from groove to groove for a journal box to slide on, said journal box passing over the grooves during its sliding movement to prevent wearing of shoulders at the ends of the riser, said flanges and web portion of one of the guides having rounded bearing portions to strengthen the flanges and web portions where joined to each other, a tapered wedge in said last-mentioned guide and having oppositely arranged flat faces and convex edges slidably engaging the bearing portions to prevent twisting movement of the wedge in said last-named guide, and an adjusting means connected to the wedge and the frame.

JOHN B. SWAN.